Figure 1:
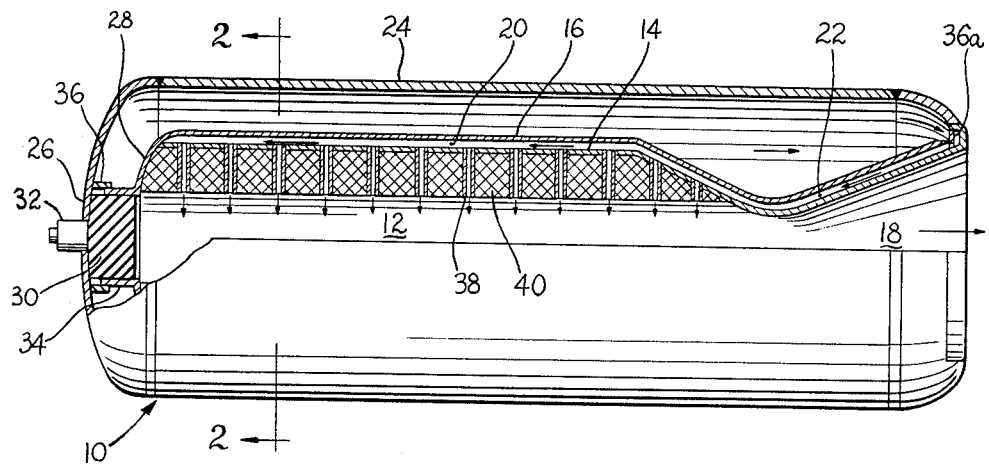

April 13, 1965   R. F. STRAUSS ETAL   3,177,657
ROCKET ENGINE
Filed Oct. 2, 1961

INVENTOR.
ROBERT F. STRAUSS
GERALD GOLUB
BY
*William R. Wright*
AGENT

United States Patent Office 3,177,657
Patented Apr. 13, 1965

3,177,657
ROCKET ENGINE
Robert F. Strauss, Morris Plains, N.J., and Gerald Golub, Orlando, Fla., assignors to Thiokol Chemical Corporation, Bristol, Pa., a corporation of Delaware
Filed Oct. 2, 1961, Ser. No. 142,169
11 Claims. (Cl. 60—35.6)

This invention relates generally to rocket engines and more particularly to a rocket engine of the hybrid type which employs both solid and liquid propellants.

Rocket engines of this type are known in the art and are usually characterized by one or more disadvantageous features which limit their utility. Among these features are: unsatisfactory burning characteristics due, among other reasons, to non-uniformity of combustion; a need for complex and space consuming propellant feed apparatus and controls therefor; a design inherently hazardous because of the possibility of propellant leakage and accidental, premature firing of the engine; a design which is incapable of a maximum loading of the rocket engine propellants; and propellant injector means which are unprotected from uncontrollable metal burnout.

Accordingly, the main object of the present invention is to provide an improved rocket engine of the hybrid type which obviates the above and other disadvantageous features of known structures.

An important object of the present invention is to provide an improved rocket engine of the hybrid type which embodies a novel propellant injection system.

Another important object of the present invention is to provide an improved hybrid rocket engine of simple, practical construction wherein the solid propellant is ignited upon contact by the liquid propellant.

A further important object of the present invention is to provide an improved hybrid rocket engine wherein safe and simple means is provided for pressurizing the liquid propellant and ensuring its injection and uniform flow over the entire surface of the solid propellant.

A still further important object of the present invention is to provide an improved hybrid rocket engine injection system wherein the liquid propellant is radially injected over the solid propellant for combustion therewith.

Other objects and advantages of the present invention will become apparent during the course of the following description.

In its broadest aspects the invention contemplates a novel liquid propellant injection system for a hybrid rocket engine which ensures uniform liquid flow over the entire surface of the solid propellant to effect uniform combustion thereof without exposing the injector assembly to uncontrollable metal burnout.

Figure 2:
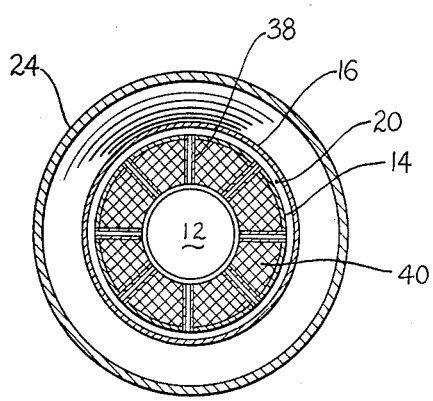

In the drawings we have shown one embodiment of the invention. In this showing:

FIGURE 1 is a diagramamtic central, longitudinal sectional view of the hybrid rocket engine and injection system comprising the present invention; and FIGURE 2 is a transverse sectional view thereof taken on the line 2—2 of FIGURE 1.

Referring to the drawings, numeral 10 designates the hybrid rocket engine as a whole which comprises a combustion chamber 12 having spaced inner and outer walls 14 and 16, the inner wall terminating in an exhaust nozzle 18.

The outer wall 16 defines a substantially coextensive annular chamber 20 and liquid propellant passage 22 for regenerative cooling respectively with the inner combustion chamber wall 12 and the exhaust nozzle 18. The outer combustion chamber wall 16 also comprises the inner wall of a concentric tank 24 containing the liquid propellant and terminating forwardly in a header 26 spaced from the combustion chamber header 28.

A pressurant for the liquid propellant in the tank 24 which may be a solid propellant 30 having an igniter 32, is mounted between the headers 26 and 28 in a chamber 34 having communication with the liquid propellant in the tank 24. The liquid propellant is sealed from the chamber 12 and the annular chamber 20 by means of burst bands 36 and 36a.

As is clearly shown in both figures of the drawings, a plurality of circumferentially spaced, radially arranged injection tubes 38 are attached to the inner combustion chamber wall 14 at longitudinally spaced points and each communicates with the annular chamber 20 for a reason which will become apparent. The solid propellant 40 is cast over the injection tubes 38 to a depth radially coextensive therewith so that the solidified propellant and the open ends of the tubes form an annular apertured surface defining an elongated tubular combustion zone in the chamber 12.

The operation of the hybrid rocket engine and its injection system is believed to be apparent. When the igniter is fired, it initiates the combustion of the liquid propellant pressurizer 30 which burns evolving considerable gas which bursts the band 36 communicating with the tank 24 and pressurizes the liquid propellant therein and acts to displace it from its stored position. This bursts the band 36a leading to the exhaust nozzle passage 22 and the liquid propellant flows through this regenerative cooling passage into the annular chamber 20 surrounding the solid propellant 40.

The liquid propellant is then distributed through the radial injection tubes 38 which afford communication between the annular chamber 20 and the combustion zone in the center of the solid propellant 40. Upon injection from the separate, spaced, radial injection tubes 38 into the combustion zone, the liquid propellant (if it is an oxidizer) will react hypergolically (without the addition of heat) with the grain of the solid propellant 40 to generate the gaseous products of combustion required to propel the rocket engine.

As the surface of the solid fuel 40 burns evenly back from its original inner surface on line with the open inner ends of the radial injection tubes 38, the tube ends burn off and enter into the combustion mass. It is to be noted that the radial injection system described provides uniform liquid propellant flow over the entire surface of the solid propellant 40 without exposing the injector assembly to uncontrollable metal burnout and without requiring liquid propellant pressurizer controls.

It is to be understood that the form of the invention herewith shown and described is to be taken as a preferred example of the same and that various changes in the shape, size and arrangement of parts may be resorted to without departing from the spirit of the invention or the scope of the subjoined claims.

What is claimed is:

1. A hybrid rocket engine comprising a combustion chamber including a regenerative cooling chamber communicating therewith terminating in an exhaust nozzle, a solid propellant lining the inner face of the wall of said combustion chamber, and means connected with said cooling chamber and said combustion chamber for supplying a liquid propellant therethrough to the inner surface of said solid propellant for combustion therewith to generate propulsive gases for the rocket engine.

2. A hybrid rocket engine comprising a combustion chamber including a regenerative cooling chamber communicating therewith terminating in an exhaust nozzle, a tank including a liquid propellant communicating through said regenerative cooling chamber with said combustion chamber, a solid propellant lining the inner face of the wall of said combustion chamber, and means connected with said tank and operative to pressurize said liquid propellant and deliver it through said cooling chamber into said combustion chamber to the inner surface of said solid propellant for combustion therewith to generate propulsive gases for the rocket engine.

3. A device as recited in claim 2 wherein said combustion chamber includes plural conduit means for said cooling chamber for simultaneously effecting delivery of said liquid propellant to said solid propellant at axially and circumferentially spaced points.

4. An injection system for a hybrid rocket engine having a combustion chamber including an annular solid propellant lining its inner face comprising a tank including a liquid propellant surrounding and spaced from said combustion chamber to form a regenerative cooling chamber therewith, a plurality of radially disposed injection tubes mounted in the wall of the combustion chamber communicating with said cooling chamber and extending inwardly to the inner surface of said solid propellant lining, and means for pressurizing said liquid propellant and forcing it into said cooling chamber and through said injection tubes to react with said solid propellant lining and generate propulsive gases for the rocket engine.

5. The system as recited in claim 4 wherein said injection tubes are circumferentially spaced about the wall of the combustion chamber.

6. The system as recited in claim 4 wherein said injection tubes are spaced axially along substantially the entire length of the combustion chamber.

7. The system as recited in claim 4 wherein said injection tubes are spaced circumferentially and axially of substantially the entire wall of the combustion chamber.

8. A hybrid rocket engine comprising a combustion chamber terminating in an exhaust nozzle, a tank including a liquid propellant mounted concentrically about said combustion chamber and spaced from the wall thereof to define therewith a regenerative cooling chamber and passage for said combustion chamber and exhaust nozzle, a plurality of radially disposed injection tubes mounted in said combustion chamber wall and communicating with said cooling chamber, an annular layer of solid propellant cast onto said wall of said combustion chamber and terminating at the inner ends of said tubes, and means for pressurizing the liquid propellant in said tank and delivering it to said cooling chamber and simultaneously through said injection tubes into contact with said solid propellant to react therewith and generate propulsive gases for the rocket engine.

9. An engine as recited in claim 8 wherein said injection tubes are circumferentially spaced about said combustion chamber wall.

10. An engine as recited in claim 8 wherein said injection tubes are axially spaced throughout substantially the entire length of said combustion chamber.

11. An engine as recited in claim 8 wherein said injection tubes are spaced circumferentially and axially of substantially the entire wall of said combustion chamber.

References Cited by the Examiner
UNITED STATES PATENTS

| | | | |
|---|---|---|---|
| 2,286,909 | 6/42 | Goddard | 60—35.6 |
| 2,753,801 | 7/56 | Cumming. | |
| 3,017,748 | 1/62 | Burnside | 60—35.6 |
| 3,068,641 | 12/62 | Fox | 60—35.6 |

SAMUEL LEVINE, *Primary Examiner.*

JULIUS E. WEST, ABRAM BLUM, *Examiners.*